(12) United States Patent
Stadermann et al.

(10) Patent No.: US 9,758,392 B2
(45) Date of Patent: Sep. 12, 2017

(54) PHASED CHARGING AND DISCHARGING IN CAPACITIVE DESALINATION

(71) Applicants: LAWRENCE LIVERMORE NATIONAL SECURITY, LLC, Livermore, CA (US); The Board of Trustees of the Leland Stanford Junior University, Palo Alto, CA (US)

(72) Inventors: Michael Stadermann, Pleasanton, CA (US); Yatian Qu, Stanford, CA (US); Juan G. Santiago, Stanford, CA (US); Ali Hemmatifar, Stanford, CA (US)

(73) Assignees: Lawrence Livermore National Security, LLC, Livermore, CA (US); The Board of Trustees of the Leland Stanford Junior University, Stanford, CA (US)

( * ) Notice: Subject to any disclaimer, the term of this patent is extended or adjusted under 35 U.S.C. 154(b) by 54 days.

(21) Appl. No.: 14/951,180

(22) Filed: Nov. 24, 2015

(65) Prior Publication Data

US 2017/0144902 A1    May 25, 2017

(51) Int. Cl.
| | | |
|---|---|---|
| *C02F 1/46* | (2006.01) | |
| *C02F 1/469* | (2006.01) | |
| *C02F 1/00* | (2006.01) | |
| *C02F 103/08* | (2006.01) | |

(52) U.S. Cl.
CPC ............ *C02F 1/4691* (2013.01); *C02F 1/008* (2013.01); *C02F 2103/08* (2013.01); *C02F 2201/46* (2013.01)

(58) Field of Classification Search
CPC .... C02F 1/4691; C02F 1/008; C02F 2201/46; C02F 2103/08
See application file for complete search history.

(56) References Cited

U.S. PATENT DOCUMENTS

| | | | |
|---|---|---|---|
| 2010/0140096 A1* | 6/2010 | Yang | ..................... C02F 1/4602 204/672 |
| 2012/0273359 A1 | 11/2012 | Suss et al. | |
| 2014/0202880 A1 | 7/2014 | Suss et al. | |

* cited by examiner

*Primary Examiner* — Arun S Phasge
(74) *Attorney, Agent, or Firm* — Eddie E. Scott

(57) ABSTRACT

A system combines complete, ultra-thin cells into a monolithic and robust framework necessary for desalination applications which yields orders of magnitude faster desalination. The electrode pairs are located so that a flow of feed water flows through or around the electrode pairs with the flow perpendicular to sequentially applied electric potentials. The system is controlled to charge the series of electrode pairs sequentially or phased. That means the charging of the second electrode pair is delayed with regard to the charging of the first electrode pair and the charging of a third electrode pair is delayed with respect to the charging of the second electrode pair.

28 Claims, 8 Drawing Sheets

PHASED CHARGING AND DISCHARGING IN CAPACITIVE DESALINATION

STATEMENT AS TO RIGHTS TO APPLICATIONS MADE UNDER FEDERALLY SPONSORED RESEARCH AND DEVELOPMENT

This invention was made with government support under Contract No. DE-AC52-07NA27344 awarded by the Department of Energy. The Government has certain rights in this invention.

BACKGROUND

Field of Endeavor

The present application relates to desalination and more particularly to phased charging and discharging in capacitive desalination.

State of Technology

This section provides background information related to the present disclosure which is not necessarily prior art.

Water purification—the rendering of non-potable water into water fit for human consumption and use—may involve many processes including desalination, disinfection and decontamination. Desalination technologies typically fall into three categories: reverse osmosis (RO) membrane filtration, multi-stage flash distillation, and electrokinetic desalination methods, such as capacitive deionization (CDI). Unlike CDI, RO and distillation are subject to high equipment capital, operation, and maintenance costs, which are associated with required high fluid pressure or temperature to desalt.

CDI is a relatively new technology known as a robust, energy efficient, and cost effective technology for desalination of water with a low or moderate salt content. It requires low voltage (~1V) power supply for removing salt and low pressure pump for delivering feedwater to the system. The active component is a pair of specially engineered porous carbon electrodes. Upon applying potential (charging step), salt ions are removed from the feed water and held electrostatically in electric double layers (EDLs) along the pore surfaces. Once the EDLs are fully charged, the clean water is pushed out of the system. The system is then regenerated by removing the voltage (discharging step), allowing salt ions to spontaneously release from the pore surfaces and into the feed, forming a brine.

CDI systems are mostly operated in single- or multiple-pass continuous flow mode in which the throughput and permeate recovery are coupled. This operational mode is useful in the case of constant feedwater properties, e.g. ionic composition, as the quality of effluent stream is more predictable. Stopped flow or batch mode desalination is another operating scenario in which the salt solution is quiescent and charging and flow stages are sequential rather than simultaneous. In both cases, the effluent concentration varies with time during adsorption and desorption steps.

During constant voltage charging step in continuous flow mode, effluent concentration drops quickly at first and reaches a minimum. Then it slowly increases since (1) the electrode adsorption rate decreases and (2) the new solution displaces the desalted solution. Similarly during discharging step, concentration increases sharply due to high desorption rate at the beginning and then starts to slowly decrease as the brine is replaced by feedwater. This slowly varying concentration profile is not desired; as it extends the charging/discharging cycle time and lowers the overall permeate recovery. In other words, the conventional method uses more energy per produced freshwater and it produces more brine (waste).

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Applicant's system provides a cell with more than one pair of electrodes, where each electrode is separated from all others by an ultra-thin porous non-conducting membrane, hereafter referred to as segmented electrodes. The cell combines the thin electrodes into a monolithic and robust framework necessary for desalination applications which yields orders of magnitude faster desalination. The electrode pairs are located so that a flow of feed water flows through the electrode pairs with the flow perpendicular to sequentially applied electric potentials. The system is controlled to charge the series of electrode pairs sequentially or phased. That means the charging of the second electrode pair is delayed with regard to the charging of the first electrode pair and the charging of a third electrode pair is delayed with respect to the charging of the second electrode pair by an equal amount of time.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
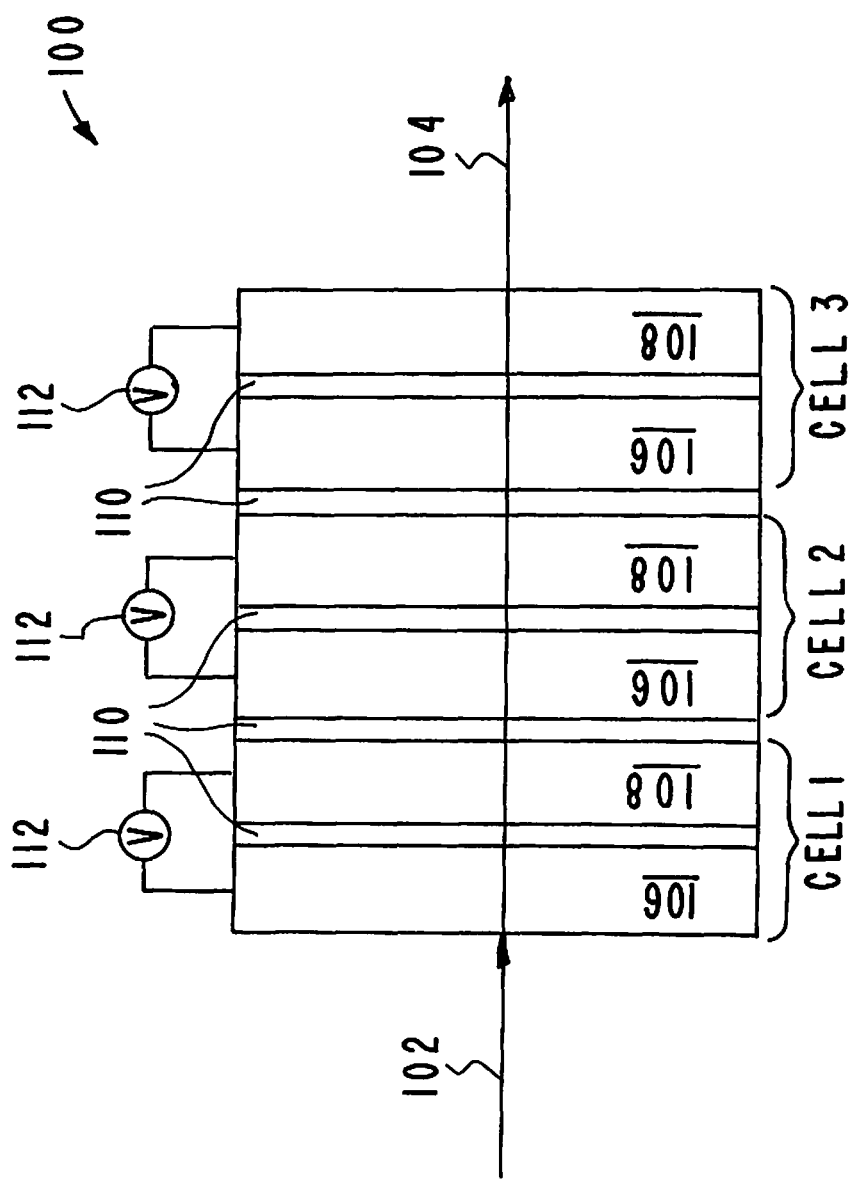
FIG. 1 illustrates a prior art "flow-through" electrode capacitive desalination system.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Referring now to the drawings and in particular to FIG. 1, a prior art system for charging segmented electrodes is illustrated. The prior art system is designated generally by the reference numeral 100. Examples of the prior art systems are illustrated and described in United States Published Patent Applications Nos. 2012/0273359 and 2014/0202880. The disclosures of United States Published Patent Applications Nos. 2012/0273359 and 2014/0202880 are incorporated herein by this reference.

The prior art system 100 charges all the electrodes at the same time and rate while water flows through the cells at a constant rate, resulting in an even removal of salt throughout the electrodes. This can be done either at constant current through the electrode pairs, or at constant voltage applied to the electrode pairs. The former is preferred for better control of salt removal. The simultaneous charging of electrodes has several drawbacks: during the charging (salt removal) step, the portion of salt that is in the last electrode pair (or near the end of the electrode volume if a single electrode pair is used) at the beginning of the charge will spend less time in the electrodes and thus have less salt removal than water that is in the first electrode pair. The water with the lesser amount of salt removed may not meet the desired final salinity of the water, and thus will have to be discarded along with the brine. Similarly, at the end of the charging step, water that has just entered the electrodes has only been partly desalted compared to water that has passed through the electrodes entirely, and will likewise have to be discarded.

The prior art system 100 is an electrode "flow-through" capacitive desalination system that involves flowing feed water from an input 102 through cells 1, 2, and 3 each including a pair of monolithic porous electrodes 106 and 108 separated by an ultrathin non-conducting porous film 110 to produce an output 104 of desalted water.

Electrical circuits 112 energize the electrodes 106 and 108 of cells 1, 2, and 3. This produces electrical potentials acting on the feed water to produce desalted water. In the system 100 the pairs of electrodes 106 and 108 are located so that a flow of feed water, illustrated by the arrow 102, flows through the electrodes 106 and 108 perpendicular to the applied electric potential produced by the electrical circuits 112. Electrical circuits 112 charge all the electrodes at the same time and rate while water flows through the cells at a constant rate, resulting in an even removal rate of salt throughout all electrode pairs.

The simultaneous charging of electrodes has several drawbacks: during the charging (salt removal) step, the portion of salt that is in the last electrode pair (or near the end of the electrode volume if a single electrode pair is used) at the beginning of the charge will spend less time in the electrodes and thus have less salt removed than water that is in the first electrode pair. The salt with the lesser amount of salt removed may not meet the desired final salinity of the water, and thus will have to be discarded along with the brine. Similarly, at the end of the charging step, water that has just entered the electrodes has only been partially desalted compared to water that has passed through the electrode entirely, and will likewise have to be discarded.

Figure 2A:
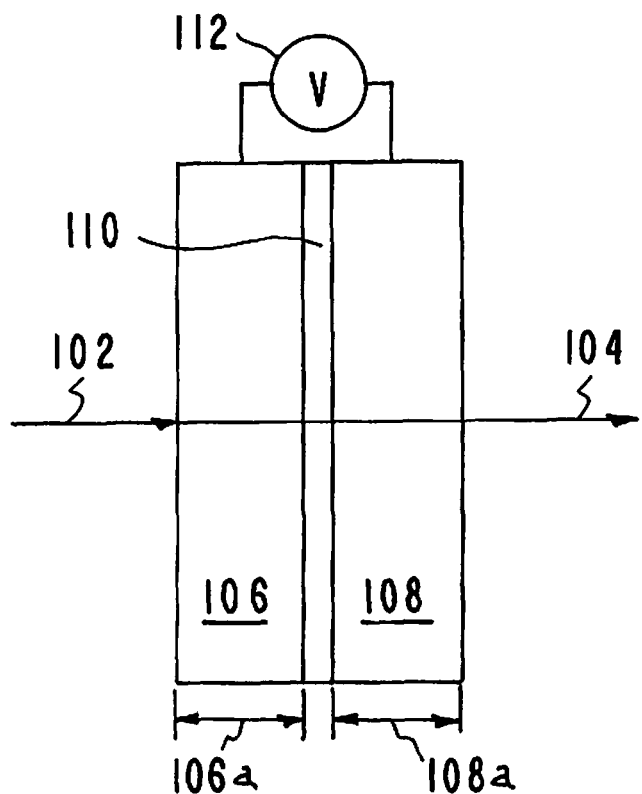
FIG. 2A shows feed water from an input through a cell having a single pair of monolithic porous electrodes separated by an ultrathin non-conducting porous film.
Figure 2B:
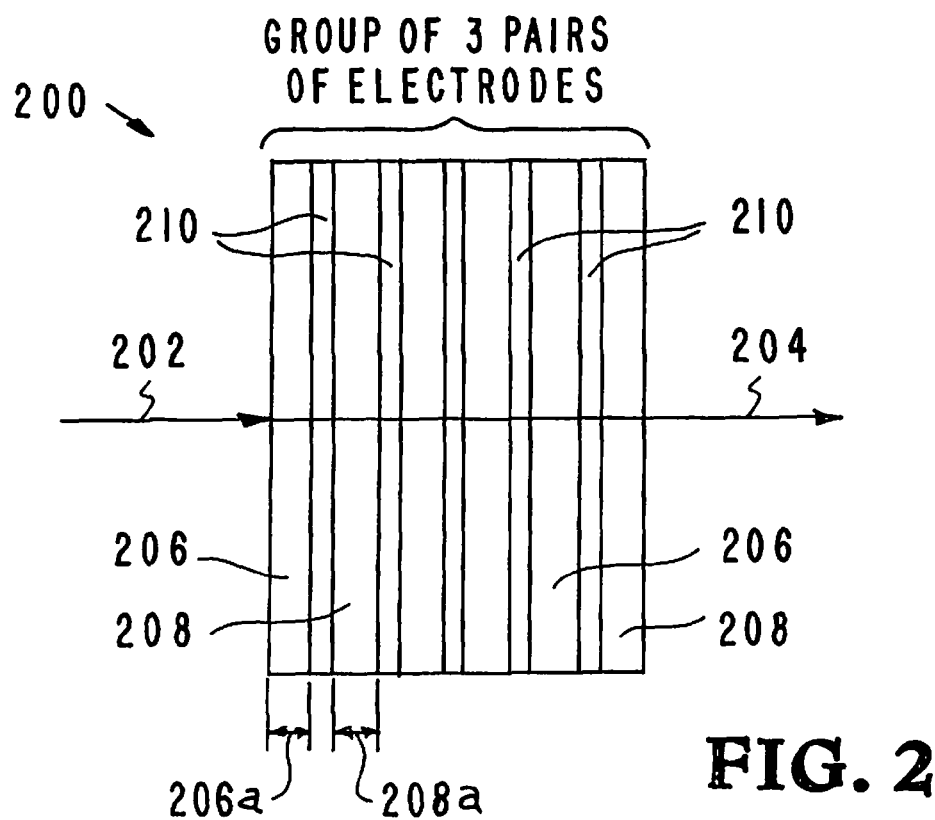
FIG. 2B illustrates segmented electrodes as a group of three pairs of thin electrodes separated by a porous separator.

Referring now to FIGS. 2A and 2B, an embodiment of the inventors' desalination system is illustrated. This embodiment is designated generally by the reference numeral 200. Applicant's system 200 utilizes segmented electrodes having multiple layered cells. The system 200 combines complete, ultra-thin cells into a monolithic and robust framework necessary for desalination applications which yields orders of magnitude faster desalination.

The majority of prior art CDI systems (as shown in FIG. 1) use single electrode pair along a given flow path. This is illustrated in FIG. 2A which show feed water from an input 102 through a cell including a pair of monolithic porous electrodes 106 and 108 separated by an ultrathin non-conducting porous film 110 to produce an output 104 of desalted water. The electrode pair has electrodes 106 and 108 of 1 mm thickness as illustrated by the dimension designations 106a and 108a. For flow through CDI electrodes, the electrode resistance can be reduced and thus energy efficiency increased by breaking a single pair of thick electrodes down into multiple pairs of thinner electrodes, e.g. a pair of 1 mm electrodes can be replaced with three pairs of 0.3 mm thick electrodes, which will reduce the energy cost by a factor of nine. This configuration is called "segmented electrodes."

Referring now to FIG. 2B, the aforementioned "segmented electrodes" system is illustrated. The segmented electrodes system is designated generally by the reference numeral 200. In the segmented electrodes system 200 the electrode resistance is reduced and energy efficiency is increased by breaking the single pair of thick electrodes shown in FIG. 2A down into multiple pairs of thinner electrodes, e.g. a pair of 1 mm electrodes has been replaced with three of 0.3 mm thick electrodes, which will reduce the energy cost by a factor of nine. FIG. 2B illustrates the segmented electrodes as a group of three pairs of 0.3 mm electrodes 206 and 208 separated by a porous separator 210. Each electrode pair has electrodes 206 and 208 of 0.3 mm thickness as illustrated by the dimension designations 206a and 208a.

In the system 200 the three pairs of electrodes 206 and 208 are located so that a flow of feed water, illustrated by the arrow 202, flows through the electrodes 206 and 208 with the flow perpendicular to an applied electric potential produced by electrical circuits. The electrical circuits are controlled to charge the series of three electrodes sequentially or phased; that means the charging of the second electrode is delayed with regard to the charging of the first electrode, the charging of a third electrode is delayed with respect to the charging of the second electrode by an equal amount of time.

Figure 3:
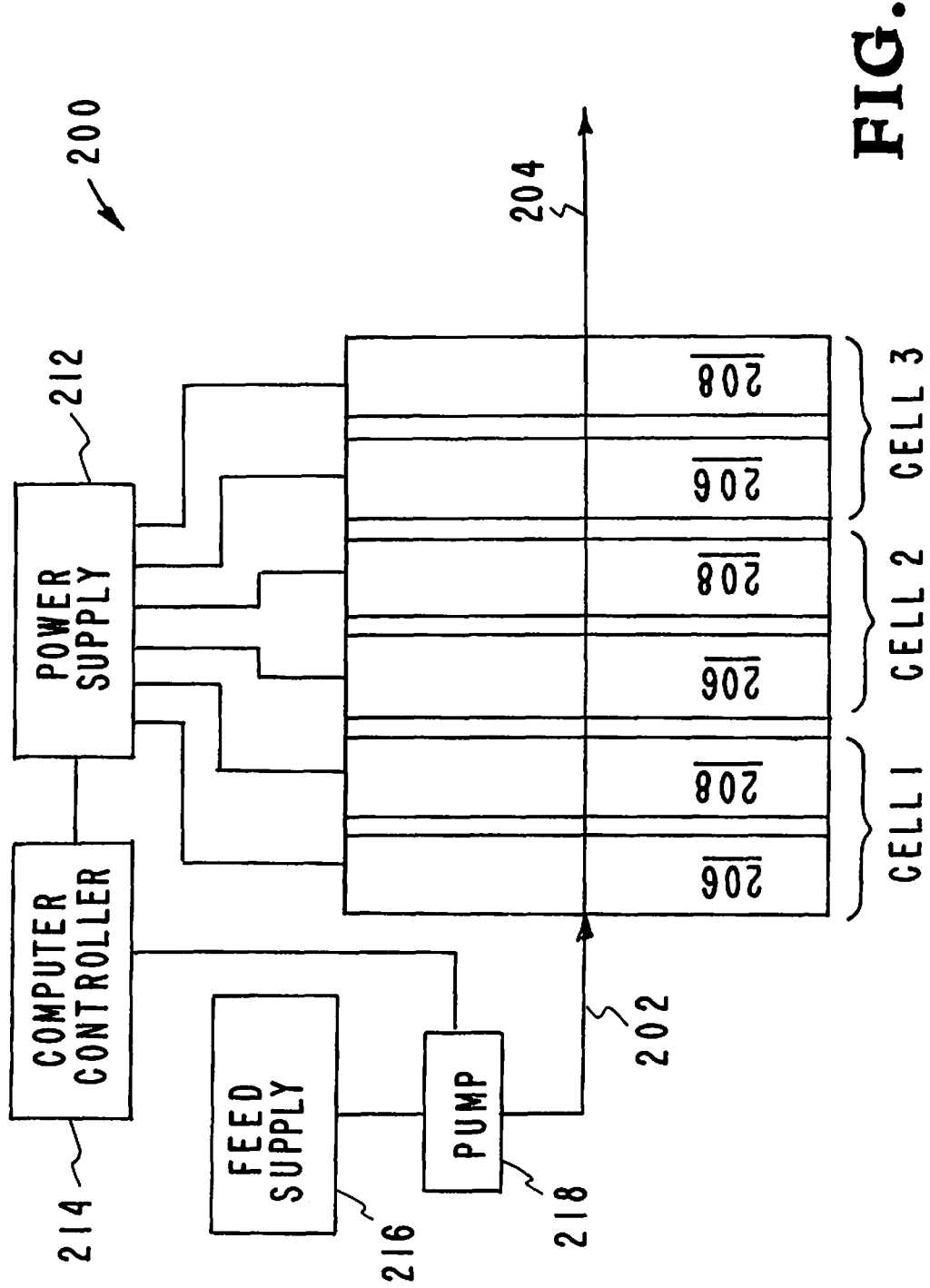
FIG. 3 illustrates the segmented electrodes system in greater detail.

Referring to FIG. 3, the aforementioned segmented electrodes system 200 is shown in greater detail. In the system 200 the three pairs of electrodes 206 and 208 are located so that a flow of feed water, illustrated by input 202, flows through the electrodes 206 and 208 with the flow perpendicular to an applied electric potential produced by electrical circuits of power supply 212. The electrical circuits are controlled by computer controller 214 to charge the series of three electrodes 206 and 208 sequentially or phased; that means the charging of the second electrode is delayed with regard to the charging of the first electrode, the charging of a third electrode is delayed with respect to the charging of the second electrode by an equal amount of time.

FIG. 3 illustrates a group of three cells in series wherein there is a feed supply 216, a pump 218, a power supply 212 and a computer controller 214. When the system of FIG. 3 is in operation the pump 218 directs the water in the feed supply into the electrode group at some volume determined by the computer controller 214. The computer controller 214 also directs the power supply 212 to send voltage via the leads to the appropriate cell in the array of electrode cells. The computer controller 214 will match the flow of water and the phase of voltage applied to the electrode cells to achieve maximum performance of the system 200.

In the system 200, the wasted volume of water is reduced by charging the series of three electrodes 206 and 208 sequentially or phased; that means the charging of the second electrode pair is delayed with regard to the charging of the first electrode pair, the charging of a third electrode pair is delayed with respect to the second electrode pair by an equal amount of time, and so on for all subsequent electrode pairs. Thus, it can be insured that all volumes of water that are desalted will have an equal amount of salt removed from them, reducing volume of unusable water that has to be discarded.

The optimal delay time is dependent primarily on the rate of flow through the electrode compared to the electrode volume and lies between a third and a full volume of flow time; e.g. if the electrode volume is 1 ml, and the flow rate is 1 ml/min. then the optimum delay time will lie between 0.3 min. and 1 min. Other parameters of relevance include the charging rate, the thickness of the electrodes, parasitic currents in the cell, concentration of the feed water and ion motion through diffusion. By phasing the charge of the electrode pairs, it can be insured that the water volume passing through the electrodes is uniformly desalted: since the final electrode pair is not charging at the beginning of the charge, the water inside it will not be desalted at all and no energy is spent on partial desalination of a water volume that will not be recovered.

Figure 4:
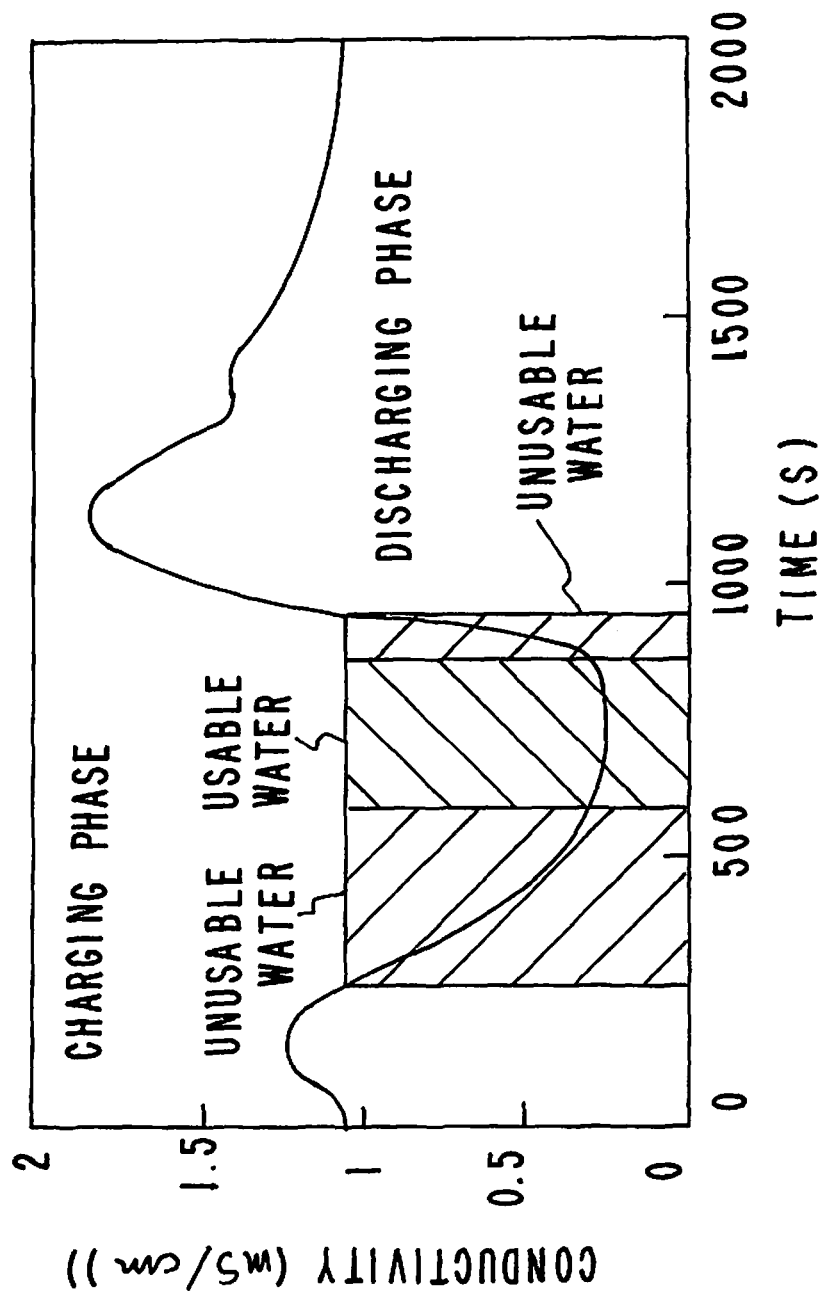
FIG. 4 is a graph showing an example of the voltage that is transmitted to the electrode cells.

Referring to FIG. 4, a graph shows an example of the voltage that is transmitted to the electrode cells 206 and 208 from the power supply 214. Shown in FIG. 4 are both a charging phase and a discharging phase. The cross hatched areas indicate when unusable water, usable water and unusable water exits the cell at the outlet (point 204).

In the system 200, the total amount of salt removal is increased beyond the capabilities of an un-phased electrode by charging two or more electrodes rapidly and phased. Each volume of water is desalted to the limits of the electrode pair as it passes through each electrode pair, effectively stacking the desalination capacity of all the pairs in the device. In this operation the charge rate of the electrode is such that the electrode goes from un-charged to fully charged in the time that it takes a volume equal to the electrode volume to pass through the cell, e.g. if the cell volume is 1 ml and the flow rate is 1 ml, the charge rate will be such that the cell can fully charge in 1 min. The delay between charging for subsequent electrodes is shorter in this case, compared to the first embodiment.

In additional embodiments, the first, second, and third cells are mimicked with additional cells using flow-between cells that are connected in series with minimal dead volume between them. This can be achieved, for example by breaking a single thick electrode pair into multiple smaller electrode pairs in the flow direction.

Applicant's system provides segmented electrodes in a multiple layered cells. The electrode pairs are located so that a flow of feed water flows through the electrode pairs with the flow perpendicular to sequentially applied electric potentials. Upon applying potential (charging step), salt ions are removed from the feed water and held electrostatically in electric double layers along the pore surfaces. Once the electrode pairs are fully charged, the clean water is pushed out of the system. The system is then regenerated by removing the voltage (discharging step), allowing salt ions to spontaneously release from the pore surfaces and into the feed, forming a brine.

The electrical circuits are controlled by computer controller to charge the electrode pairs sequentially or phased; that means the charging of the second electrode is delayed with regard to the charging of the first electrode, the charging of a third electrode is delayed with respect to the charging of the second electrode by an equal amount of time. In one embodiment the electrode pairs are charged slower than the step of flowing water containing salt through the electrode pairs. In another embodiment the electrode pairs are charged as fast as the step of flowing water containing salt through the electrode pairs.

Example 1

Equal Time Delay

Figure 5A:
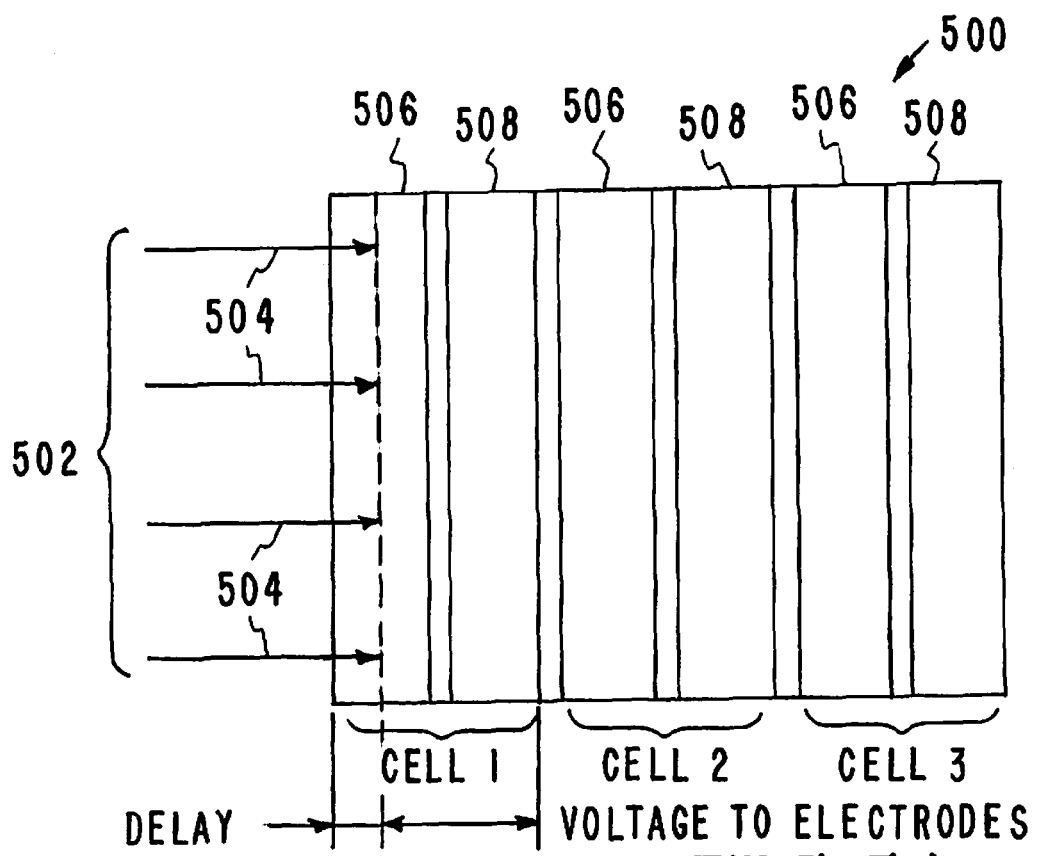
FIGS. 5A, 5B, and 5C illustrate a first example of the inventor's capacitive desalination system for removing salt from water.
Figure 5B:
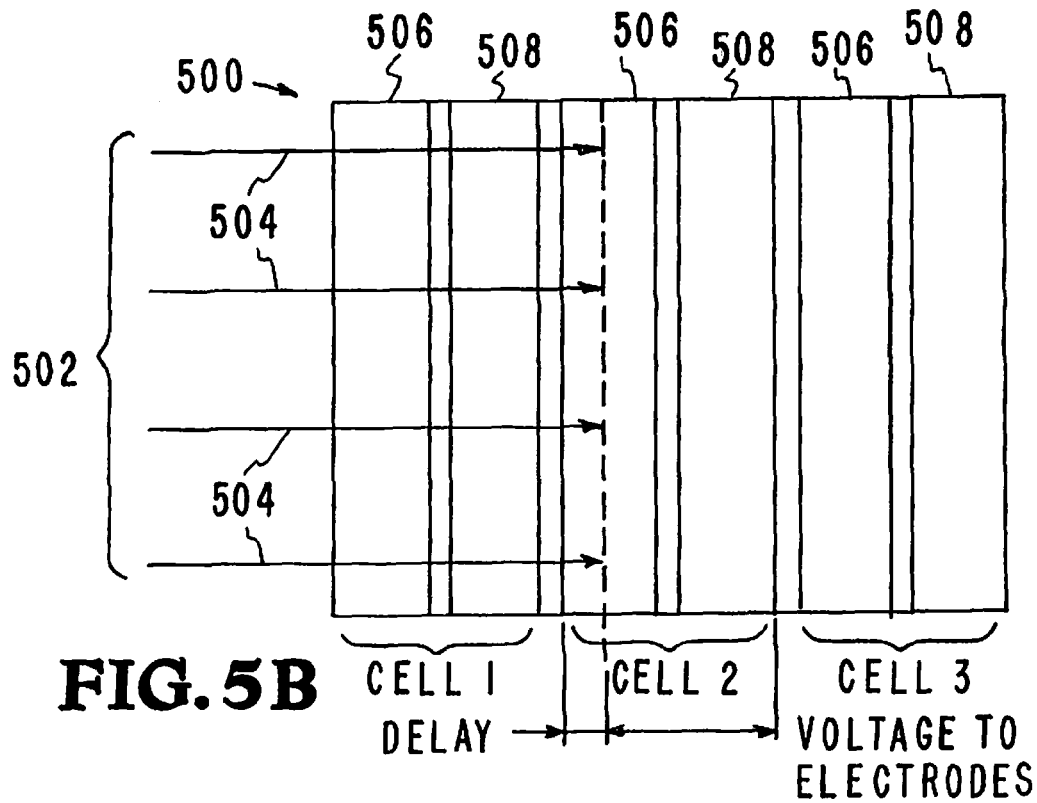
Figure 5C:
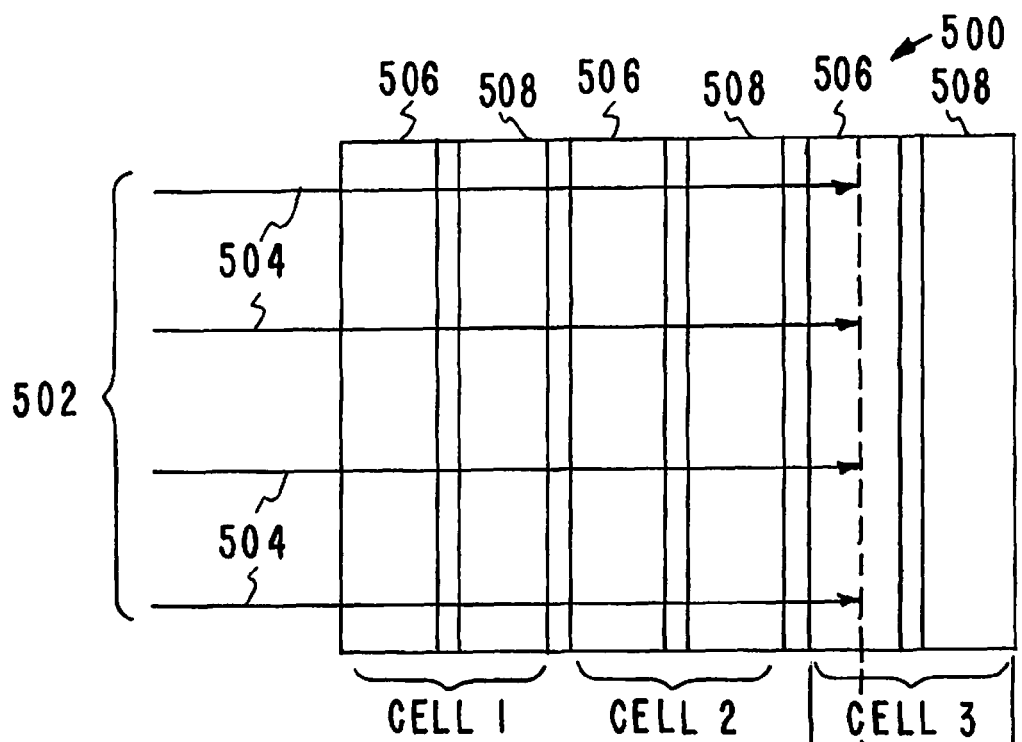

Referring now to FIGS. 5A, 5B, and 5C; a first example of the inventor's capacitive desalination system for removing salt from water is illustrated wherein there is an equal time delay. This example is designated generally by the reference numeral 500. In the system 500 the electrical circuits are controlled by a computer controller to charge the electrode pairs sequentially or phased; that means the charging of the second electrode pair is delayed with regard to the charging of the first electrode pair, the charging of a third electrode is delayed with respect to the charging of the second electrode pair by an equal amount of time.

As illustrated in FIGS. 5A, 5B, and 5C; the system 500 is a segmented electrodes system with three cells; cell 1, cell 2, and cell 3, shown for illustrative purposes. It is understood that additional cells can be incorporated in the system 500. Each of the cells; cell 1, cell 2, and cell 3, include a pair of electrodes 506 and 508. A feed supply of water 502 illustrated by arrows 504 flows through the electrodes 506 and 508 with the flow perpendicular to an applied electric field produced by an electrical power supply. A computer controller operates to charge the electrodes 506 and 508 sequentially or phased; that means the charging of the second cell is delayed with regard to the charging of the first cell, and the charging of a third cell is delayed with respect to the charging of the second cell by an equal amount of time.

Referring now to FIG. 5A, the feed supply of water 502 illustrated by arrows 504 flows into the first cell, cell 1. The computer controller operates to charge the electrodes 506 and 508 of cell 1 after a time delay.

Referring now to FIG. 5B, the feed supply of water 502 illustrated by arrows 504 flows from the first cell, cell 1, into the second cell, cell 2. The computer controller operates to charge the electrodes 506 and 508 of cell 2 after a time delay.

Referring now to FIG. 5C, the feed supply of water 502 illustrated by arrows 504 flows from the second cell, cell 2, into the third cell, cell 3. The computer controller operates to charge the electrodes 506 and 508 of cell 3 after a time delay. The electrical circuits are controlled to charge the series of three electrode pairs (cell 1, cell 2 & cell 3) sequentially or phased; that means the charging of the second electrode pair, cell 2, is delayed with regard to the charging of the first electrode pair, cell 1, and the charging of a third electrode pair, cell 3, is delayed with respect to the charging of the second electrode pair, cell 2, by an equal amount of time.

Example 2

Unequal Time Delay

Figure 6A:
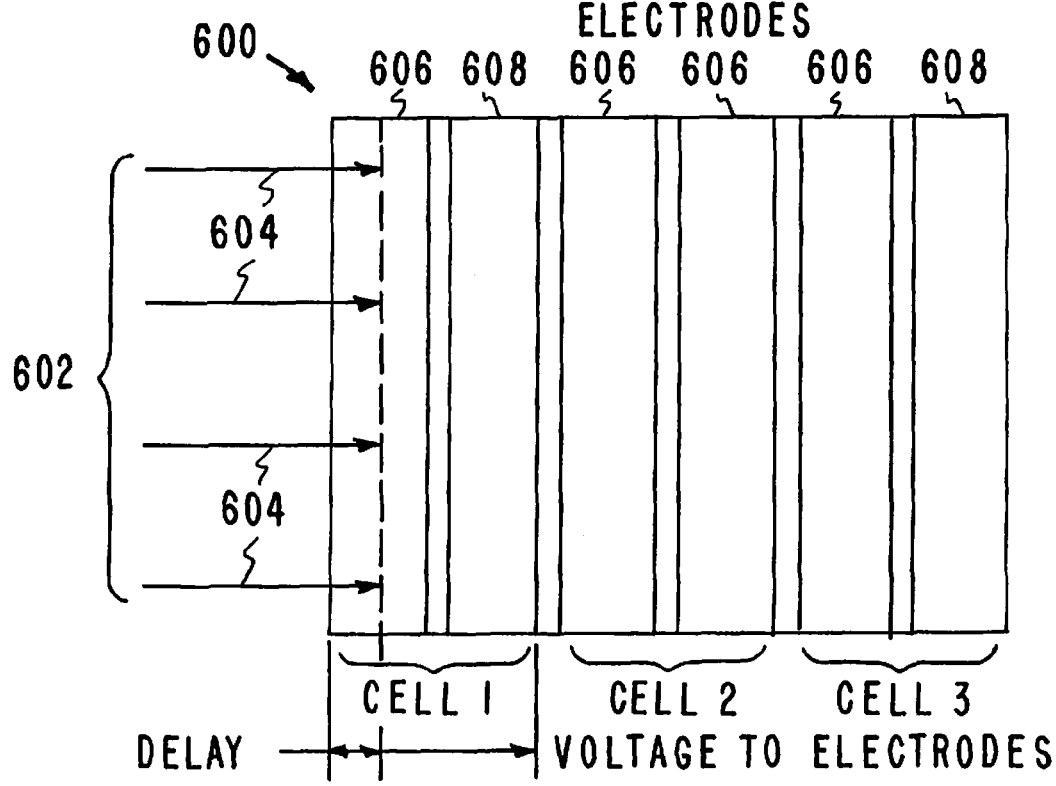
FIGS. 6A, 6B, and 6C illustrate a second example of the inventor's capacitive desalination system for removing salt from water.
Figure 6B:
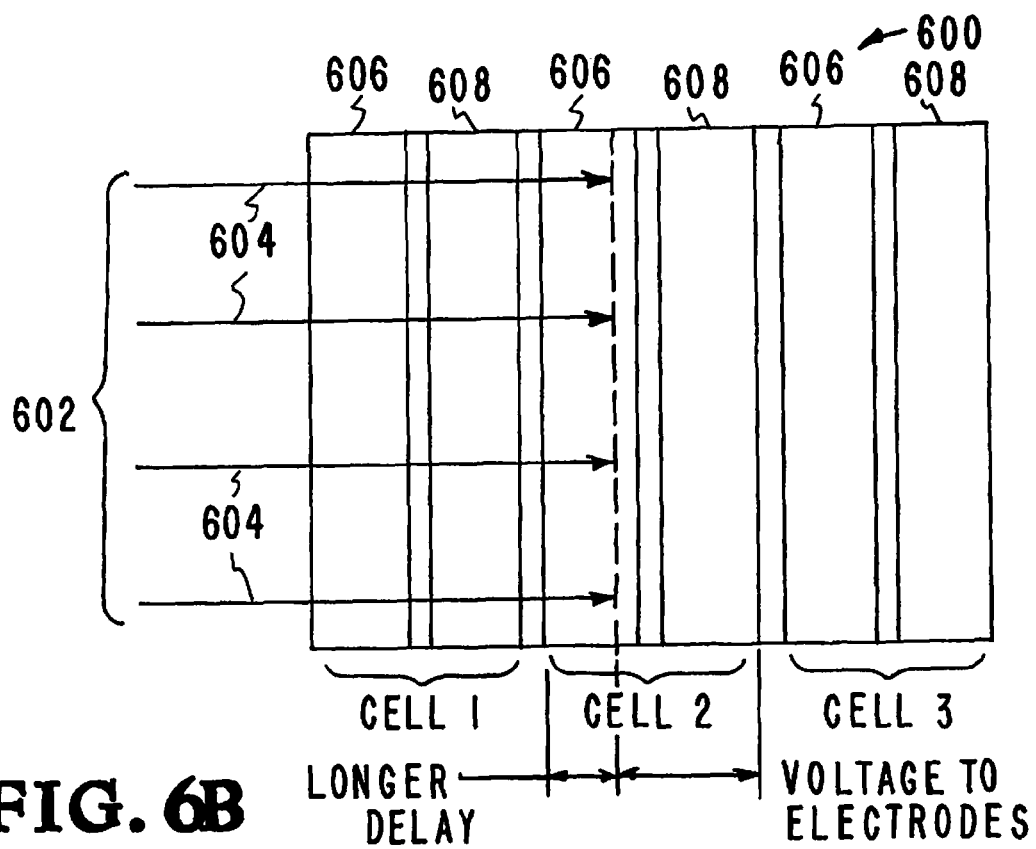
Figure 6C:
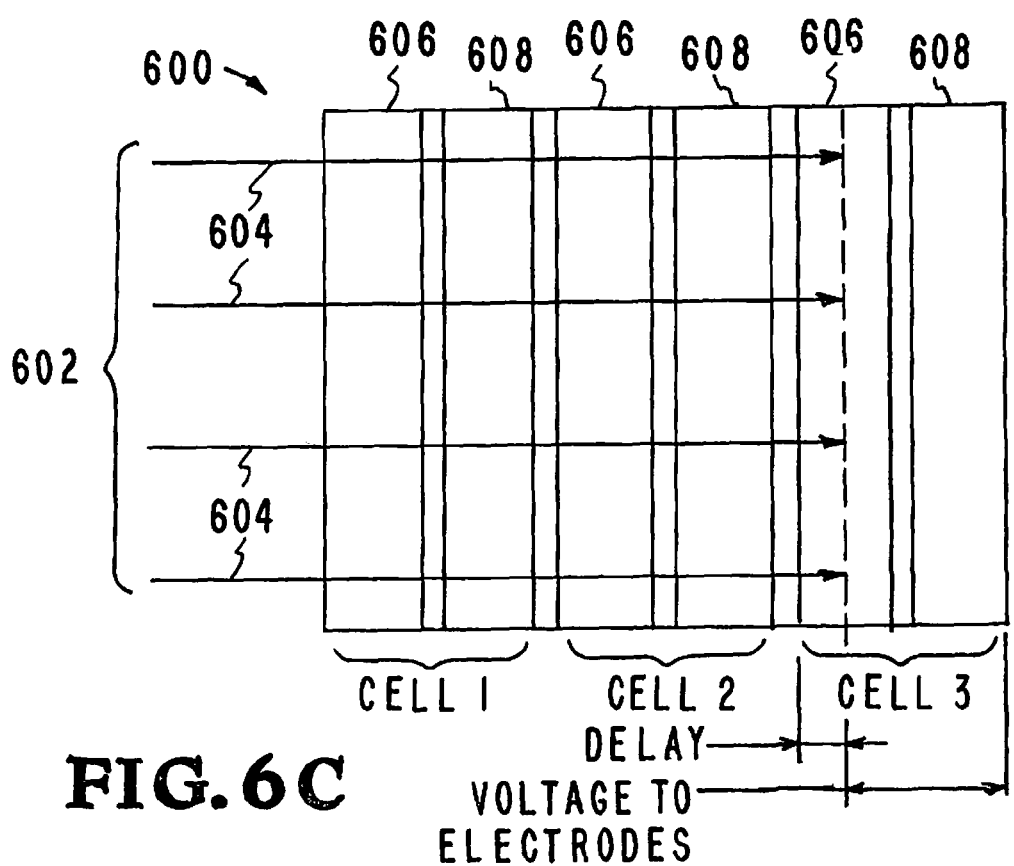

Referring now to FIGS. 6A, 6B, and 6C; a second example of the inventor's capacitive desalination system for removing salt from water is illustrated wherein there is an unequal time delay. This example is designated generally by the reference numeral 600. In the system 600 the electrical circuits are controlled by a computer controller to charge the electrode pairs sequentially or phased; that means the charging of the second electrode pair is delayed with regard to the charging of the first electrode pair, the charging of a third electrode is delayed with respect to the charging of the second electrode pair by an unequal amount of time.

As illustrated in FIGS. 6A, 6B, and 6C; the system 600 is a segmented electrodes system with three cells; cell 1, cell 2, and cell 3, shown for illustrative purposes. It is understood that additional cells can be incorporated in the system 600. Each of the cells; cell 1, cell 2, and cell 3, include a pair of electrodes 606 and 608. A feed supply of water 602 illustrated by arrows 604 flows through the electrodes 606 and 608 with the flow perpendicular to an applied electric field produced by an electrical power supply. A computer controller operates to charge the electrodes 606 and 608 sequentially or phased; that means the charging of the second cell is delayed with regard to the charging of the first cell, and the charging of a third cell is delayed with respect to the charging of the second cell by an unequal amount of time.

Referring now to FIG. 6A, the feed supply of water 602 illustrated by arrows 604 flows into the first cell, cell 1. The computer controller operates to charge the electrodes 606 and 608 of cell 1 after a time delay.

Referring now to FIG. 6B, the feed supply of water 602 illustrated by arrows 604 flows from the first cell, cell 1, into the second cell, cell 2. The computer controller operates to charge the electrodes 606 and 608 of cell 2 after a larger time delay.

Referring now to FIG. 6C, the feed supply of water 602 illustrated by arrows 604 flows from the second cell, cell 2, into the third cell, cell 3. The computer controller operates to charge the electrodes 606 and 608 of cell 3 after a time delay. The electrical circuits are controlled to charge the series of three electrode pairs (cell 1, cell 2 & cell 3) sequentially or phased; that means the charging of the second electrode pair, cell 2, is delayed with regard to the charging of the first electrode pair, cell 1, and the charging of a third electrode pair, cell 3, is delayed with respect to the charging of the second electrode pair, cell 2, by an unequal amount of time.

Example 3

Multiple Groups of Electrode

Figure 7:
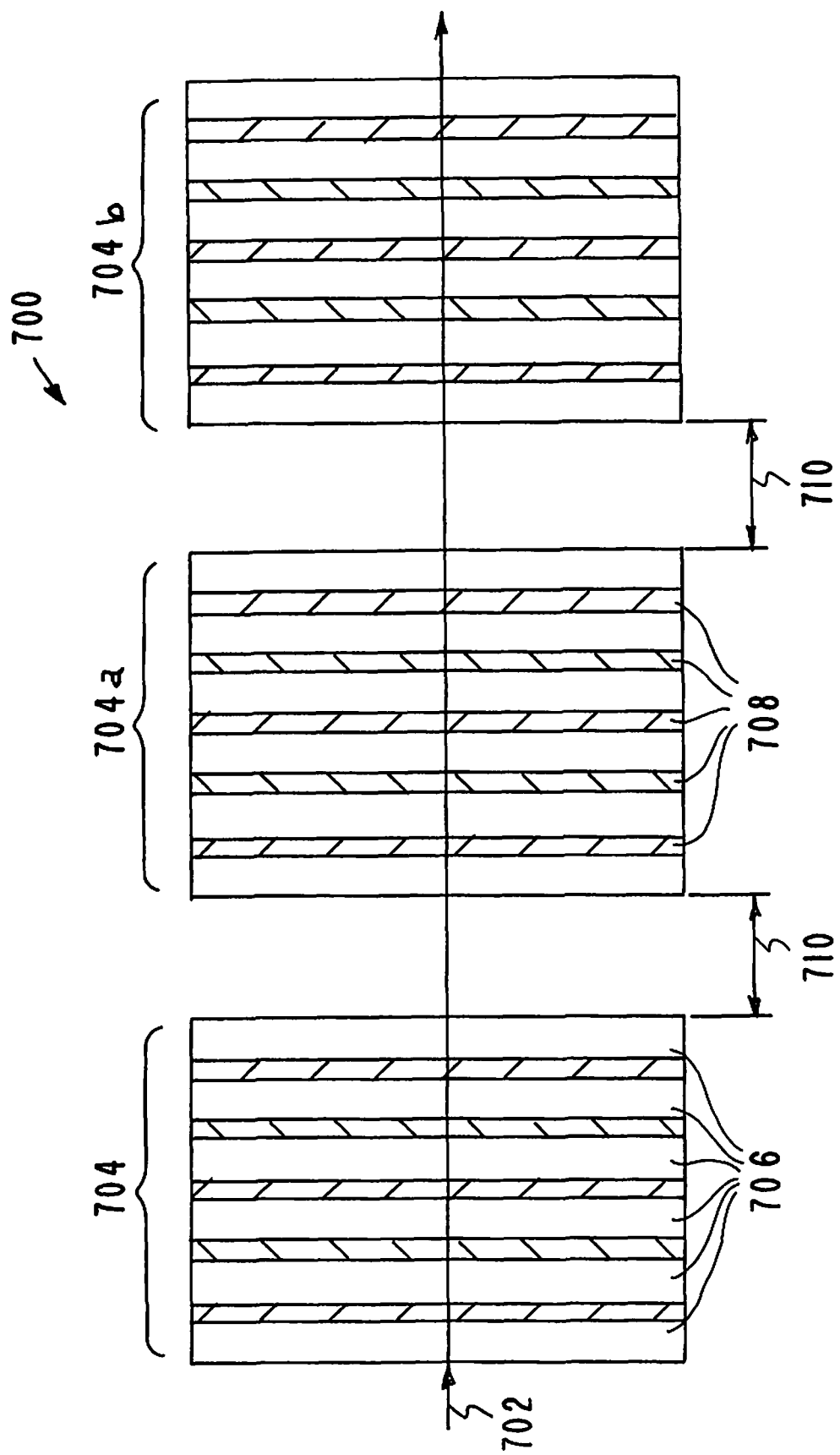
FIG. 7 illustrates a third example of the inventor's capacitive desalination system for removing salt from water.

Referring now to FIG. 7, a third example of the inventor's capacitive desalination system for removing salt from water is illustrated. This example is designated generally by the reference numeral 700. The system 700 includes multiple groups of electrodes with the individual groups spaced apart. As illustrated in FIG. 7 the system 700 includes groups 704, 704a, and 704b; however it is to be understood that additional groups of electrodes are envisioned and this application is not limited to three groups of electrodes. Each of the groups 704, 704a, and 704b includes multiple pairs of electrodes 706. Three pairs of electrodes 706 are shown in FIG. 7; however, it is to be understood that the groups can contain additional pairs of electrodes. The electrodes 706 and the electrode pairs are separated by spacers 708. The groups 704, 704a, and 704b of electrodes 706 are separated by spaces indicated by the arrows 710.

A feed supply of water 702 flows through the electrodes 706 with the flow perpendicular to an applied electric field produced by an electrical power supply. A computer controller operates to charge the electrodes 706 of each electrode pair sequentially or phased; that means the charging of the second electrode pair is delayed with regard to the charging of the first electrode pair in each group 704, 704a, and 704b, and the charging of a third electrode pair is delayed with respect to the charging of the second electrode pair in each group 704, 704a, and 704b. There is also a delay between the charging of the electrode pairs in the groups 704, 704a, and 704b.

The inventors have developed a capacitive desalination apparatus for removing salt from water utilizing a first cell having a first pair of porous electrodes, a second cell having a second pair of porous electrodes, a third cell having a third pair of porous electrodes, a power source adapted to apply a first electric potential to the first pair of porous electrodes in the first cell and apply a second electric potential to the second pair of porous electrodes in the second cell and apply a third electric potential to the third pair of porous electrodes in the third cell, and a controller adapted to flow the water containing the salt through or next to the first pair of porous electrodes in the first cell, flow the water containing the salt through or next to the second pair of porous electrodes in second first cell, flow the water containing the salt through or next to the third pair of porous electrodes in the third cell, wherein the controller is adapted to apply the second electric potential to the second pair of porous electrodes in the second cell with a delay with regard to the a first electric potential being applied to the first pair of porous electrodes in the first cell, and wherein the controller is adapted to apply the third electric potential to the third pair of porous electrodes in the third cell with a delay with regard to the second electric potential being applied to the second pair of porous electrodes in the second cell, thereby removing the salt from the water. In one embodiment the capacitive desalination apparatus for removing salt from water is adapted to provide an equal amount of time delay in applying the second electric potential to the second pair of porous electrodes in the second cell and applying a third electric potentials to the third pair of porous electrodes. The inventors have also developed a capacitive desalination method of charging a capacitive deionization system that utilizes multiple porous electrode pairs in series, wherein the multiple porous electrode pairs include a first electrode pair, a second electrode pair, and an additional electrode pair, that includes the steps of flowing water containing salt through or next to the multiple porous electrode pairs, sequentially applying an electrical potential to the corresponding multiple electrode pairs as the water flows through or over the multiple electrode pairs, and controlling the step of sequentially applying an electrical potential to the corresponding multiple electrode pairs as the water flows through the multiple electrode pairs to provide a delay between applying an electrical potential to the first electrode pair and applying an electrical potential to the second electrode pair, and to provide a delay between applying an electrical potential to the second electrode pair and applying an electrical potential to the additional electrode pair.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of charging a capacitive deionization system that utilizes multiple porous electrode pairs in series, wherein the multiple porous electrode pairs include a first electrode pair, a second electrode pair, and an additional electrode pair, comprising the steps of:
  flowing water containing salt through or next to the multiple porous electrode pairs,
  sequentially applying an electrical potential to the corresponding multiple electrode pairs as said water flows through or over the multiple electrode pairs, and
  controlling said step of sequentially applying an electrical potential to the corresponding multiple electrode pairs as said water flows through the multiple electrode pairs to provide a delay between applying an electrical potential to the first electrode pair and applying an electrical potential to the second electrode pair, and to provide a delay between applying an electrical potential to the second electrode pair and applying an electrical potential to the additional electrode pair.

2. The method of charging a capacitive deionization system that utilizes multiple electrode pairs in series of claim 1 wherein said step of controlling said step of sequentially applying an electrical potential to multiple electrode pairs as said water flows through or over the multiple electrode pairs such that the at least one time delay between electrode potentials are determined in part by the rate of water flowing through the electrodes.

3. The method of charging a capacitive deionization system that utilizes multiple electrode pairs arranged such that water containing salt flows in a serial fashion through or over the electrodes of claim 1 wherein said step of controlling said step of sequentially applying an electrical potential to multiple electrode pairs as said water flows through the multiple electrode pairs results in a traveling wave of electrode charge state which correlates with the motion of the flowing water containing salt through or next to the multiple electrode pairs.

4. The method of charging a capacitive deionization system that utilizes multiple electrode pairs arranged such that water containing salt flows in a serial fashion through or over the electrodes of claim 1 wherein the water flows into the first electrode pair, the water flows into subsequent electrode pairs wherein said step of controlling said step of sequentially applying electrical potentials to multiple electrode pairs as said water flows through or over the multiple electrode pairs includes providing a time delay between electric potentials applied to first and second electrode pairs which is different than the one or more subsequent time delays associated with the potential applied to any third or subsequent electrode pairs.

5. The method of charging a capacitive deionization system that utilizes multiple electrode pairs in series of claim 4 wherein said time delay is an equal time delay.

6. The method of charging a capacitive deionization system that utilizes multiple electrode pairs arranged such that water containing salt flows in a serial fashion through or over the electrodes of claim 4 wherein said time delays are not all equal to each other.

7. The method of charging a capacitive deionization system that utilizes multiple electrode pairs arranged such that water containing salt flows in a serial fashion through or over the electrodes of claim 1 where at least one of different electric potentials applied to the multiple electrode pairs is varied so as to achieve a desired value of electrical current between at least one electrode pair.

8. A method of capacitive desalination for removing salt from water, comprising the steps of:

providing a first cell having a first pair of porous electrodes, providing a second cell having a second pair of porous electrodes, providing a third cell having a third pair of porous electrodes, flowing the water containing the salt through said first pair of porous electrodes in said first cell, flowing the water containing the salt through said second pair of porous electrodes in said first cell, flowing the water containing the salt through said third pair of porous electrodes in said third cell, applying a first electric potential to said first pair of porous electrodes in said first cell, applying a second electric potential to said second pair of porous electrodes in said second cell, and applying a third electric potential to said third pair of porous electrodes in said third cell, wherein said step of applying a second electric potential to said second pair of porous electrodes in said second cell is delayed with regard to said step of applying a first electric potential to said first pair of porous electrodes in said first cell, and wherein said step of applying a third electric potential to said third pair of porous electrodes in said third cell is delayed with regard to said step of applying a second electric potential to said second pair of porous electrodes in said second cell, thereby removing the salt from the water.

9. The method of capacitive desalination for removing salt from water of claim 8 wherein said steps of applying a second electric potential to said second pair of porous electrodes in said second cell and applying a third electric potentials to said third pair of porous electrodes are delayed by an equal amount of time.

10. The method of capacitive desalination for removing salt from water of claim 8 wherein steps of applying a second electric potential to said second pair of porous electrodes in said second cell and applying a third electric potentials to said third pair of porous electrodes is delayed by an un-equal amount of time.

11. The method of capacitive desalination for removing salt from water of claim 8 wherein said step of applying a first electric potential to said first pair of porous electrodes includes providing a time delay in applying a first electric potential to said first pair of porous electrodes in said step of flowing the water containing the salt through or next to said first pair of porous electrodes in said first cell, and providing a time delay in applying a second electric potential to said second pair of porous electrodes in said step of flowing the water containing the salt through or next to said second pair of porous electrodes in said first cell, and providing a time delay in applying a third electric potential to said third pair of porous electrodes in said step of flowing the water containing the salt through or next to said third pair of porous electrodes in said first cell.

12. The method of capacitive desalination for removing salt from water of claim 11 wherein said time delays are equal.

13. The method of capacitive desalination for removing salt from water of claim 11 wherein said time delays are un-equal time delays.

14. The method of capacitive desalination for removing salt from water of claim 8 wherein said step of providing a second cell having a second pair of porous electrodes includes providing a distance between said first pair of porous electrodes and said second pair of porous electrodes and wherein said step of providing a third cell having a third pair of porous electrodes includes providing a distance between said second pair of porous electrodes and said third pair of porous electrodes.

15. A capacitive desalination apparatus for removing salt from water, comprising:

a first cell having a first pair of porous electrode means, a second cell having a second pair of porous electrode means, a third cell having a third pair of porous electrode means, means for flowing the water containing the salt through said first pair of porous electrode means in said first cell, means for flowing the water containing the salt through said second pair of porous electrode means in second first cell, means for flowing the water containing the salt through said third pair of porous electrode means in said third cell, means for applying a first electric potential to said first pair of porous electrodes in said first cell, means for applying a second electric potential to said second pair of porous electrodes in said second cell, and means for applying a third electric potential to said third pair of porous electrodes in said third cell, wherein said means for applying a second electric potential to said second pair of porous electrode means in said second cell is adapted to provide a delay with regard to said mean for applying a first electric potential to said first pair of porous electrode means in said first cell, and wherein said means for applying a third electric potential to said third pair of porous electrode means in said third cell is adapted to provide a delay with regard to said means for applying a second electric potential to said second pair of porous electrode means in said second cell, thereby removing the salt from the water.

16. The capacitive desalination apparatus for removing salt from water of claim 15 wherein said wherein said means for applying a first electric potential to said first pair of porous electrodes in said first cell provides a time delay with regard to said means for flowing the water containing the salt through said first pair of porous electrode means in said first cell, and wherein said means for applying a second electric potential to said second pair of porous electrodes in said first cell provides a time delay with regard to said means for flowing the water containing the salt through said second pair of porous electrode means in said first cell, and wherein said means for applying a third electric potential to said third pair of porous electrodes in said first cell provides a time delay with regard to said means for flowing the water containing the salt through said third pair of porous electrode means in said first cell.

17. The capacitive desalination apparatus for removing salt from water of claim 16 wherein said time delay is an equal time delay.

18. The capacitive desalination apparatus for removing salt from water of claim 16 wherein said time delay is an un-equal time delay.

19. A capacitive desalination apparatus for removing salt from water, comprising:

a first cell having a first pair of porous electrodes,
a second cell having a second pair of porous electrodes,
a third cell having a third pair of porous electrodes,
a power source adapted to apply a first electric potential to said first pair of porous electrodes in said first cell and
apply a second electric potential to said second pair of porous electrodes in said second cell and
apply a third electric potential to said third pair of porous electrodes in said third cell, and
a controller adapted to
flow the water containing the salt through or next to said first pair of porous electrodes in said first cell,
flow the water containing the salt through or next to said second pair of porous electrodes in second first cell,
flow the water containing the salt through or next to said third pair of porous electrodes in said third cell,
wherein said controller is adapted to apply said second electric potential to said second pair of porous electrodes in said second cell with a delay with regard to said a first electric potential being applied to said first pair of porous electrodes in said first cell, and
wherein said controller is adapted to apply said third electric potential to said third pair of porous electrodes in said third cell with a delay with regard to said second electric potential being applied to said second pair of porous electrodes in said second cell,
thereby removing the salt from the water.

20. The capacitive desalination apparatus for removing salt from water of claim 19 wherein said controller is adapted to provide an equal amount of time delay in applying said second electric potential to said second pair of porous electrodes in said second cell and applying a third electric potentials to said third pair of porous electrodes.

21. The capacitive desalination apparatus for removing salt from water of claim 19 wherein said first pair of porous electrodes, said second pair of porous electrodes, and said third pair of porous electrodes have individual electrodes with a thickness in the range of 0.25 mm to 3.5 mm.

22. The capacitive desalination apparatus for removing salt from water of claim 19 wherein said first pair of porous electrodes, said second pair of porous electrodes, and said third pair of porous electrodes have individual electrodes with a thickness of 0.3 mm.

23. The capacitive desalination apparatus for removing salt from water of claim 19 wherein said controller is adapted to apply said second electric potential to said second pair of porous electrodes in said second cell with a delay with regard to said a first electric potential being applied to said first pair of porous electrodes in said first cell, and is adapted to apply said third electric potential to said third pair of porous electrodes in said third cell with a delay with regard to said second electric potential being applied to said second pair of porous electrodes in said second cell, slower than said flowing the water containing salt through or next to said first, second, and third electrode pairs.

24. The capacitive desalination apparatus for removing salt from water of claim 19 wherein said controller is adapted to apply said second electric potential to said second pair of porous electrodes in said second cell with a delay with regard to said a first electric potential being applied to said first pair of porous electrodes in said first cell, and is adapted to apply said third electric potential to said third pair of porous electrodes in said third cell with a delay with regard to said second electric potential being applied to said second pair of porous electrodes in said second cell, as fast as said flowing water containing salt through or next to said first, second, and third electrode pairs.

25. The capacitive desalination apparatus for removing salt from water of claim 19 wherein said power source is a power source that is adapted
to apply a first electric potential to said first pair of porous electrodes in said first cell with a time delay with regard to said controller that is adapted to flow the water containing the salt through or next to said first pair of porous electrodes in said first cell, and
to apply a second electric potential to said second pair of porous electrodes in said first cell with a time delay with regard to said controller that is adapted to flow the water containing the salt through or next to said second pair of porous electrodes in said first cell, and
to apply a third electric potential to said third pair of porous electrodes in said first cell with a time delay with regard to said controller that is adapted to flow the water containing the salt through or next to said third pair of porous electrodes in said first cell.

26. The capacitive desalination apparatus for removing salt from water of claim 25 wherein said time delay is an equal time delay.

27. The capacitive desalination apparatus for removing salt from water of claim 25 wherein said time delay is an un-equal time delay.

28. The capacitive desalination apparatus for removing salt from water of claim 18
wherein said first cell having a first pair of porous electrodes, said second cell having a second pair of porous electrodes, and said third cell having a third pair of porous electrodes comprises a first desalination unit and
further comprising
a fourth cell having a fourth pair of porous electrodes, a fifth cell having a fifth pair of porous electrodes, and a sixth cell having a sixth pair of porous electrodes that comprises a second desalination unit, and
a seventh cell having a seventh pair of porous electrodes, an eighth cell having an eighth pair of porous electrodes, and a ninth cell having a ninth pair of porous electrodes that comprises a third desalination unit,
wherein said second desalination unit is spaced from said first desalination unit and
wherein said third desalination unit is spaced from said second desalination unit.

* * * * *